United States Patent [19]
Hazan et al.

[11] Patent Number: 5,692,432
[45] Date of Patent: Dec. 2, 1997

[54] APPLIANCE FOR TOASTING A PRODUCT

[75] Inventors: Jean-Pierre Hazan, Sucy; Jean-Louis Nagel, Limeil-Brevannes; Serge Gourrier, Paris, all of France

[73] Assignee: U.S. Philips Corporation, New York, N.Y.

[21] Appl. No.: 767,100

[22] Filed: Dec. 4, 1996

[30] Foreign Application Priority Data

Dec. 6, 1995 [FR] France .................. 95 14420

[51] Int. Cl.$^6$ ................ A47J 37/08; H05B 1/02
[52] U.S. Cl. ............ 99/328; 99/329 R; 99/329 RT; 99/333; 99/385; 99/389; 99/391; 219/411; 219/413; 219/492; 219/521
[58] Field of Search ............... 99/326–334, 385, 99/389–393; 219/411–413, 345, 482, 490–493, 501, 514, 518, 521

[56] References Cited

U.S. PATENT DOCUMENTS

| | | | |
|---|---|---|---|
| 4,130,853 | 12/1978 | Baker | 219/501 |
| 4,238,995 | 12/1980 | Polster | 99/331 |
| 4,296,312 | 10/1981 | Salem | 99/329 R |
| 4,346,651 | 8/1982 | Schickedanz | 99/327 |
| 4,430,557 | 2/1984 | Eichelberger et al. | 219/411 |
| 4,510,376 | 4/1985 | Schneider | 99/327 |
| 4,645,909 | 2/1987 | Thoben et al. | 219/411 |
| 4,727,799 | 3/1988 | Ohshima et al. | 99/331 |
| 4,734,562 | 3/1988 | Amano et al. | 219/413 |
| 4,976,194 | 12/1990 | Kelterborn et al. | 99/328 |
| 5,414,243 | 5/1995 | Snell et al. | 219/492 |

*Primary Examiner*—Timothy F. Simone
*Attorney, Agent, or Firm*—Ernestine C. Bartlett

[57] ABSTRACT

An appliance (5) for toasting a product (10) comprises detection means (12) for detecting variations of a toasting condition of the product during toasting and for allowing a user to adjust the toasting result as desired. The appliance comprises a temperature sensor (13) which measures the temperature of the product. Timing means (14) are started when a predetermined temperature (Td) is reached. The timing means (14) are stopped when either another predetermined temperature (Tf) is reached or when a predetermined period has elapsed. The appliance is also capable of controlling a process of defrosting of the product prior to toasting of said product.

11 Claims, 3 Drawing Sheets

APPLIANCE FOR TOASTING A PRODUCT

FIELD OF THE INVENTION

The invention relates to an appliance for toasting a product, comprising:

heating means, control means for controlling the heating means, timing means to provide time control of the control means, detection means for detecting variations of a toasting condition of the product during toasting and for supplying at least one control signal which activates the timing means when at least one toasting condition threshold is reached.

BACKGROUND OF THE INVENTION

A toaster basically comprises heating means (heating resistor or infrared elements), a compartment for receiving slices of bread, and control means for turning off the heating means when the bread has reached a satisfactory toasting degree.

The problem which arises during use of a toaster resides in the control of the toasting condition of the bread during the toasting process. The browning obtained should neither be too dark nor too light. Various solutions have been proposed but they solve this problem only partly.

Some appliances comprise control means which can be set by the user and which enable the operating time of the heating means to be controlled. Thus, the user can adjust the degree of browning of the bread as he desires, on the basis of successive trials.

More recent appliances measure the radiation emitted by the surface of the bread during toasting in order to determine a toasting condition and to influence the heating means. The document U.S. Pat. No. 4,976,194 proposes a toaster which is based in this principle and which is capable of at the same time toasting bread and warming up foodstuffs placed on its upper part. As regards the invention, said document reveals a control device which detects the toasting condition of the bread and which stops the toasting process when a toasting condition threshold is reached.

However, such a control device is inadequate in order to obtain a reproducible toasting quality regardless of the types of bread and their characteristics:

initial composition, consistency and coloring (white, gray, black), initial temperature (bread at ambient temperature, cold bread, frozen bread), water content, thickness of the bread to be toasted.

As a matter of fact, the relationship between the radiation emitted by the bread and its temperature depends on its emissivity, which in its turn depends on all these parameters, which makes the toasting quality thus obtained rather uncertain.

SUMMARY OF THE INVENTION

It is an object of the invention obtain toast of a quality which is much better reproducible in spite of the influence of these different initial parameters.

This object is achieved with an appliance of the type defined in the opening paragraph, in which the detection means comprise a temperature sensor which measures a temperature of the product, the detection means comprising a first comparison means for supplying a first control signal which starts the timing means when the temperature of the product is higher than a predetermined temperature which defines a first toasting condition threshold.

In this way the timing means are not activated until the bread has reached an adequate temperature in actual agreement with the effective start of the toasting process. This allows a considerable reduction of the influence of differences in parameters such as, for example, the initial temperature of the bread, the weight, and the initial degree of humidity. Thus, the instant at which toasting is started, i.e. the instant at which a precise control of the actual toasting cycle is to be started, is defined more accurately than before, toasting being effected only when the temperature of the bread is sufficiently high. This first temperature threshold constitutes a starting temperature for the action of the timing means. At this instant the control means are temporarily brought under the control of the timing means in a final period during which the main toasting process takes place.

In order to allow for the fact that the products to be toasted generally contain a considerable amount of water, the starting temperature is selected to be slightly higher than 100° C. In this way, a substantial part of the water contained particularly at the surface of a slice of bread can be evaporated during the initial heating period and the middle of the slice of bread, even if it is very cold, is thus warmed up considerably.

When the first control signal appears the timing means will perform operations during the final toasting period. The length of the final period can be determined in two ways.

In a first mode, the length of the final period is defined as a function of time by the timing means themselves, which dictate that the final period has been completed after expiry of a predetermined time. The timing means determine the instant of stopping of the heating means. The toasting process occurs during the final period of time, with or without a change in heating power. There can be a reduction in heating power. The length of the final period can de determined in advance or can be set by the user to enable him to adapt the toasting process to his personal taste. For this purpose, the user has a control means at his disposal.

To this end, the timing means comprise a counter, triggered by the first control signal, which counter measures a time control period, the timing means supplying a turn-off signal to the control means when the time control period has reached a predetermined length defining the end of toasting.

In a second mode, the heating power is changed systematically upon the appearance of the first control signal, the toasting process being continued until the bread has reached another predetermined temperature. The detection means then comprise a second comparison means for supplying a second control signal when the temperature of the product reaches a second predetermined temperature which defines a second toasting condition threshold, the timing means being responsive to the first control signal to supply a heating-characteristic change signal to the control means and being responsive to the second control signal to supply a turn-off signal to said control means in order to turn off the heating means.

This second predetermined temperature, called stop temperature, lies in the temperature range from approximately 180° C. to 200° C.

In this second mode the occurrence of the heating-characteristic change signal automatically produces the power reduction during the final period. This power reduction can be effected either in steps or continuously. This enables finer control of the decisive in which toasting of the bread takes place. Indeed, the final period is that in which the greater pan of the toasting process takes place. It is therefore desirable to provide fine control of the operations occurring in this period. In order to ensure that the toasting process proceeds not too rapidly, as a result of which it would be more difficult to control, the heating characteristic is changed at the beginning or in the course of the final period. This makes it possible to have a wider margin for the instant at which the heating means are stopped and thus to preclude burning of the bread, the toasting mechanisms having a tendency to run away at the end of the toasting process. This margin for the stopping instant is important in the case of a temperature measurement error. This error can be caused particularly by the fact that the measuring zone occupies only part of the surface of the slice of bread. Moreover, a temperature measurement error has more serious consequences when the temperature of the bread is high and when the heating power is high. Fine control of the toasting mechanisms is therefore of prime importance.

In both modes stopping of the heating means is effected by the timing means, which supply a turn-off signal to the control means in order to stop the heating.

Preferably, use is made of a temperature sensor which without mechanical contact measures infrared radiation emitted by the product. In order to be independent of variations in emissivity of the bread, the detection means preferably operate by determining an equilibrium between the fluxes exchanged between the sensor and the product to be toasted.

When the bread to be toasted is still frozen, it is possible to ensure that the appliance starts to control defrosting of the bread before it proceeds with toasting. For this purpose, the detection means comprise a third comparison means for supplying a third control signal having two states so as to control a process of defrosting the product, the timing means being such that they are started by the first state when the temperature of the product is lower than 0° C. and are stopped by the second state when the temperature of the product is over 0° C.

These as well as further aspects of the invention will be apparent from and elucidated by means of embodiments described hereinafter.

BRIEF DESCRIPTION OF THE DRAWINGS

The invention will be more fully understood by means of the following drawings given by way of non-limitative examples and in which.

DESCRIPTION OF EMBODIMENTS

Figure 1:
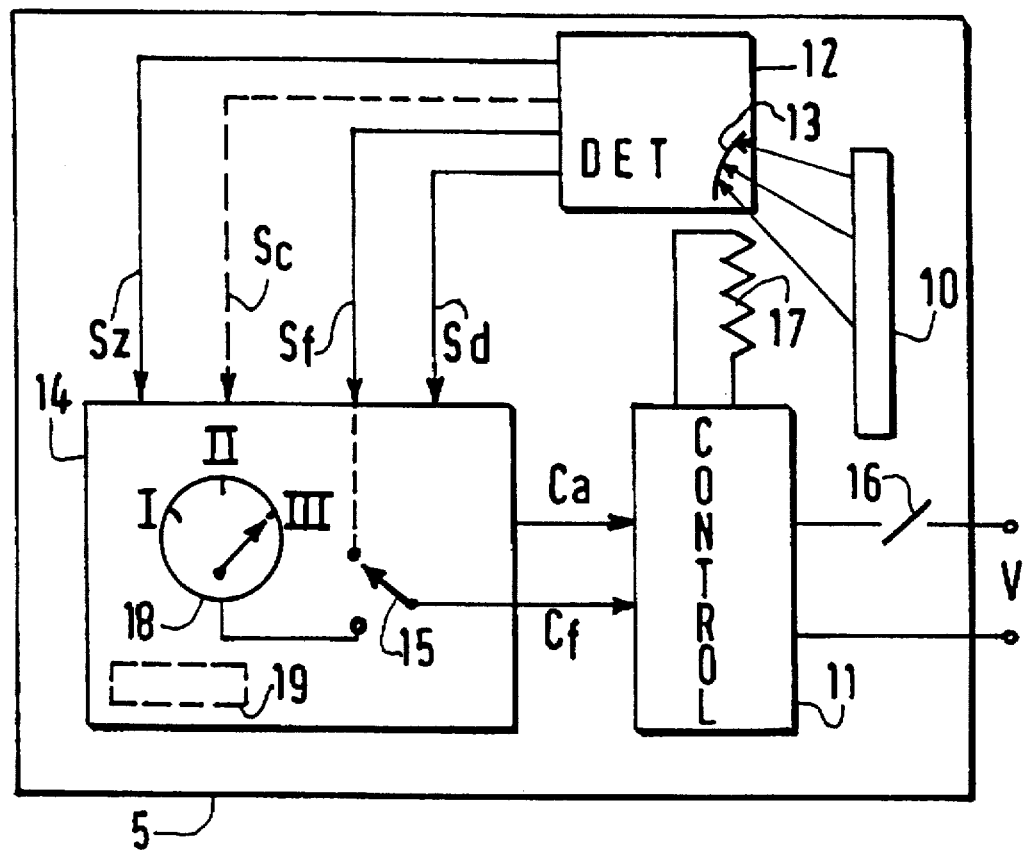
FIG. 1 is a diagram of the main elements of a toaster in accordance with the invention.

FIG. 1 shows an appliance 5 for toasting a product 10, for example a bread toaster. It comprises heating means 17, for example heating resistors or infrared heating elements. The operation of these heating means is controlled by control means CONTROL 11, which are connected to an electric power supply V via a switch 16. Detection means 12 enable the variations in the temperature of a product 10, for example a slice of bread, to be detected.

In accordance with the invention the detection means comprise a temperature sensor 13 which measures the temperature at the surface of the bread with or without mechanical contact. Timing means 14 are disposed between the detection means 12 and the control means 11.

When voltage is applied to the toaster the switch 16 is activated, thereby enabling the control means 11 to turn on the heating means 17 during the initial period. The slice of bread is then exposed to the radiation produced by the heating means, as a result of which the temperature of the slice of bread increases, which increase is measured by the temperature sensor 13. When the temperature of the bread has reached a predetermined first temperature Td, preferably slightly higher than 100° C., the detection means 12 supply a first control signal Sd to the timing means 14, which then start the determination of the length of the final period in which the timing means control the control means 11. This control mode terminates at the end of the final period.

Figure 4:
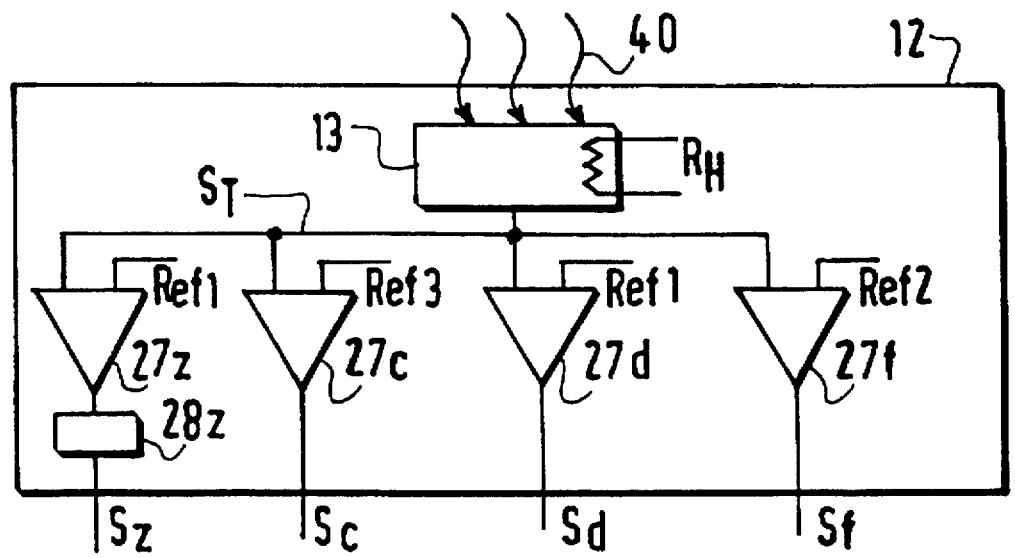
FIG. 4 is a diagram of the detection means supplying the various control signals on the basis of the measurement of the temperature at the surface of the bread.

The temperature sensor 13 is included in detection means 12 shown in FIG. 4. The sensor 13 supplies a signal $S_T$, which is compared with a reference Ref1 in a comparator $27d$. The detection means determine when the signal $S_T$ is equal to the reference Ref1 and then supply the control signal Sd. This reference can be formed by a reference voltage or by a value stored in an electronic memory.

In the first mode, the end of the final period is determined as a function of time by the timing means themselves. For this purpose they comprise a counter 19 which measures the time elapsed since the instant at which the first control signal appears and which determines the end of the final period. The predetermined length of the final period can be changed by the user with the aid of setting means, for example a knob 18. In the course of the final period the electric power dissipated in the heating elements can be reduced in order to preclude running away of the toasting process. This is most imminent as the end of the toasting operation is approached. The power can be reduced, for example, progressively or in successive steps or in accordance with other variation rules. The predetermined length is determined in accordance with the specifications of the toaster: the arrangement of the heating elements, the position of the slice of bread, the construction of the appliance. Thus, a typical length is determined in the course of preliminary tests during the design of the appliance. On an average, it is of the order of 1 to 2 minutes.

In the second mode the end of the final period is determined when the temperature of the bread reaches a predetermined second temperature called the stop temperature Tf. This temperature Tf can be chosen from the range of temperatures from approximately 180° C. to 200° C. As a matter of fact, it has been found by experiment that a satisfactory toasting of the bread is obtained in this temperature range and higher temperatures may give rise to excessive burning of the bread. When the temperature sensor measures this stop temperature, the detection means 12 supply a stop signal Sf to the timing means 14. In response to this, these means then supply a turn-off signal Cf to the control means 11 in order to turn off the heating means.

FIG. 4 shows that the detection means 12 comprise comparison means 27f which receive the signal $S_T$ from the sensor 13 and which compare this signal $S_T$ with a reference Ref2 corresponding to the predetermined temperature Tf. The comparison means 27f supply the control signal Sf when the signal $S_T$ is equal to the reference Ref2.

In the second mode, when the first control signal appears, the timing means can act upon the control means to change the heating power of the heating means. For this purpose the timing means 14 supply a heating-characteristic change signal Ca, which actuates the control means 11 so as reduce the power dissipated in the heating means.

The toasting appliance can be provided with a switch 15 which enables the one or the other mode of determining the end of the final period to be selected.

Figure 2:
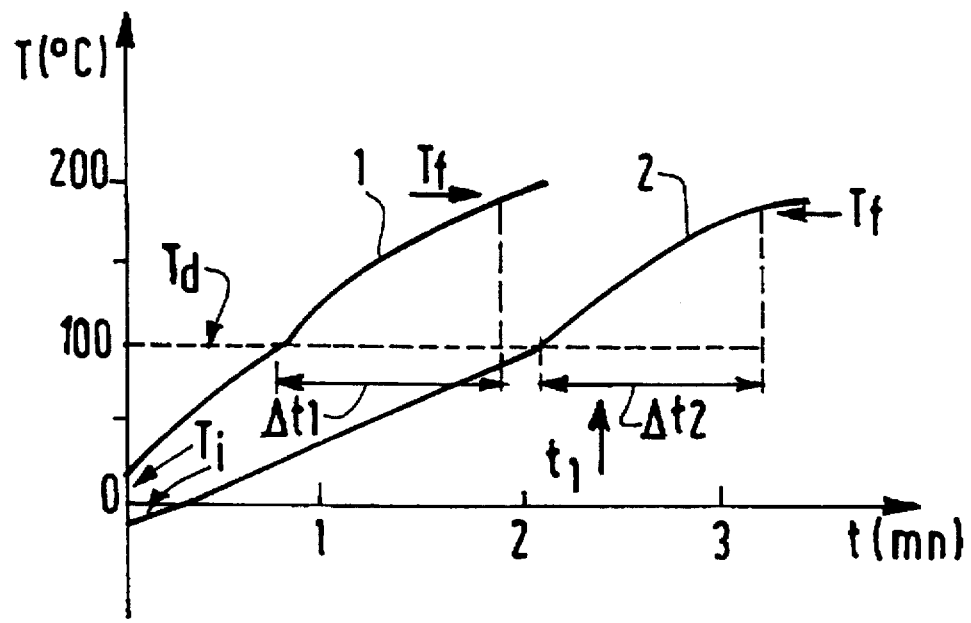
FIG. 2 shows two curves representing the variations in the temperatures of two slices of bread having different initial temperatures.

FIG. 2 shows two curves relating to two slices of bread having different initial temperatures. For example, the slice 1 has an initial temperature Ti=20° C. and the slice 2 has an initial temperature Ti=−10° C. When a starting temperature Td of 100° C. is chosen, it follows that the slice 1 will reach 100° C. well before the slice 2. By counting down the time from the starting instant at which the slice is exposed to the radiation of the heating means, it is evident that if the toasting process had been stopped, for example, at the instant t1, this would be too late for the slice 1 (after Tf) and too early for the slice 2 (before Tf). In accordance with the invention the timing means only control the toasting process from the instant at which the bread has reached the starting temperature (Td). The actual toasting operation can then proceed as described hereinbefore during the final periods Δt1 or Δt2 for each of the slices of bread. In the case that the toasting process is limited by the stop temperature Tf (FIG. 2), it appears that the periods Δt1 and Δt2 are close to each other, which is an indication that the toasting process is better under control than before. Conversely, in the case of a given operating period Δt the temperatures obtained at the end of the period are substantially equal. The curves bend slightly at the end of the toasting operation, which shows that the heating power is reduced for a better control of the toasting mechanisms.

In the case of frozen bread the inventive principle can be applied to the defrosting period of the bread. If the temperature sensor detects a bread temperature below 0° C. when the bread is inserted, the detection means 12 supply a, for example analog, control signal Sc which activates a defrosting program. The timing means are then started. To generate the signal Sc the signal $S_T$ supplied by the sensor is applied to a third comparison means 27c, which also receives a reference signal Ref3 corresponding to a reference temperature of 0° C. The third comparison means 27c supplies the comparison signal Sc, whose sign changes when the bread temperature exceeds the threshold of 0° C. The operations of changing the heating power can be carried out as set forth hereinbefore. The heating power can be changed so as to speed up the defrosting of the bread. Defrosting can be ended either when a predetermined time has elapsed or when a predetermined temperature is reached. The predetermined time imposed by the defrosting program is non-critical. It is typically of the order of 0.5 to 1 minute. The predetermined temperature can be near the ambient temperature and is by no means critical, provided that it is below 100° C. It may correspond, for example, to a given value of the analog signal Sc. At the end of defrosting the toasting operations described hereinbefore are started automatically.

Figure 3:
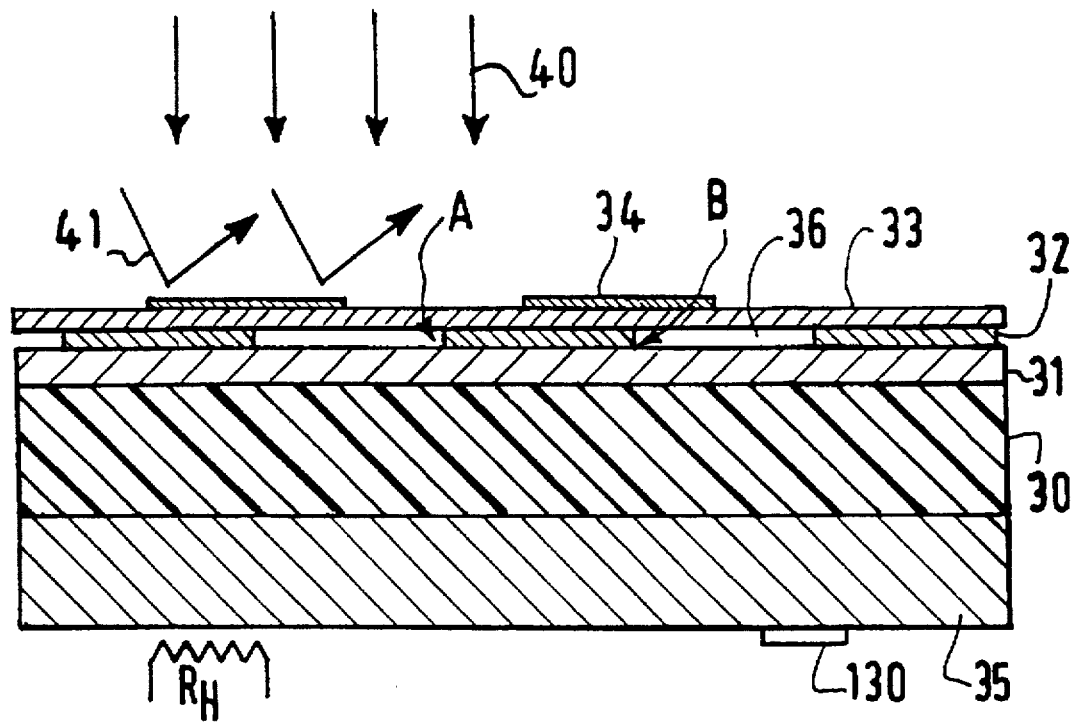
FIG. 3 is a sectional view of a temperature sensor operating without mechanical contact.

FIG. 3 gives the structure of a temperature sensor 13 which operates without mechanical contact. A substrate 30 having a low thermal conductivity, for example of polyimide, carries a metal layer 31, for example constantan, on which contact pads formed by another metal layer 32, for example copper, are disposed. The junctions A, B at the transition between the copper 32 and the recesses 36 at the surface of the constantan 31 each form a thermocouple. An absorbing layer 33 absorbs the incident radiation 40. By alternately masking one of the two junctions, for example the junction B, against exposure to the radiation 40 by means of a reflecting layer 34, of for example gold (reflected radiation 41), a series arrangement of thermocouples is obtained whose electromotive forces are summed up to produce a voltage large enough to be measured readily. The back of the substrate is designed to remain isothermal during use. The substrate 30 is arranged on a well conducting support 35, for example a copper plate, in order to assure a uniform temperature of the rear surface of the substrate 30 (isothermal surface). Nevertheless, the sensor will have a low heat capacity.

The sensor may comprise an additional temperature sensor 130, shielded from direct radiation, by means of which the substrate temperature can be measured, from which the temperature of the thermocouple junctions which are not exposed to radiation is derived. This additional temperature sensor can be an additional thermocouple incorporated in the substrate or a resistive element, for example a resistor having a negative temperature coefficient.

Preferably, the detection means 12 operate by detection of an equilibrium between the fluxes exchanged between the sensor 13 and the product 10 whose temperature is to be measured. The measurement principle is as follows. When two bodies X and Y having temperatures $T_X$ and $T_Y$, respectively, are placed opposite one another, a thermal exchange occurs. This results in a thermal flux which is expressed as a function of the temperature by the equation:

$$\Phi_r = F.f(\epsilon_X, \epsilon_Y).\sigma.S(T_X^4 - T_Y^4)$$

where $\Phi_r$ is the flux resulting from the thermal exchanges,

S are the facing surfaces,

σ is Boltzmann's constant, $\epsilon_X$, $\epsilon_Y$ are the average emissivities of the facing surfaces, $f(\epsilon_X, \epsilon_Y) = 1/(1/\epsilon_X + 1/\epsilon_Y - 1)$, F is a form factor.

When the temperature $T_Y$ is known it is consequently possible to determine the temperature $T_X$.

By measuring the difference in temperature between the surface exposed to the radiation and the rear surface of the sensor it is possible to deduce the temperature of the product disposed before the sensor. Since the rear surface of the sensor is isothermal, the temperature of the rear surface is that of the cold junctions (not exposed to radiation) arranged on the front surface. The electromotive force developed between the warm and cold junctions thus enables the temperature of the product to be measured. However, the exchanged flux depends on the emissivities of the relevant surfaces. In order to eliminate the influence of these parameters, it is also preferred that the detection means operate by cancellation of the exchanged thermal flux. The temperature of the product is determined on the basis this cancellation of the thermal flux. This is achieved by heating the sensor until the difference in temperature measured by the thermocouples is canceled. By measuring the temperature of the substrate the temperature of the product can be derived. In this case the temperature of the substrate of the sensor is equal to or very-close to that of the product, because the emissivities of the facing surfaces no longer plays a part in this measurement. The temperature of the substrate is measured by the sensor 130.

To heat the substrate 35 in the present configuration the substrate is provided with a heating resistor $R_H$ through which an electric current is fed. The resistor $R_H$ can be arranged, for example, on the isothermal rear surface of the substrate. The detection means 12 can dissipate electric power in the heating resistor $R_H$.

The heat capacity of the sensor 13 is low enough for thus heating the sensor more rapidly than the bread requires to reach the predetermined temperature. The sensor can be heated successively and rapidly to different temperatures, for example to approximately 100° C. and to approximately 180°–200° C. The low heat capacity of the sensor also allows the sensor to cool down rapidly enough, after the heating has been turned off, to be operative again for the next slice of bread.

The measurement can be effected in the following manner. The dissipated electric power makes it possible to rapidly raise the temperature of the substrate, which is measured by the auxiliary sensor 130, to the selected predetermined temperature. When the temperature of the bread rises during toasting the signal $S_T$ supplied by the sensor 13 changes and becomes zero when the product reaches the desired temperature, in which case there is an equilibrium in the radiant flux between the bread and the sensor. The detection means 12 then supply a control signal Sz. For this, after the substrate has reached the desired predetermined temperature (approximately 100° C. and approximately 180°–200° C. depending on the stage in question), the detection means detect when the signal $S_T$ becomes zero in that a comparator 27z compares the signal $S_T$ with a reference Ref4 whose value is zero. The comparator 27z enables the control signal Sz to be supplied when $S_T$ is equal to Ref4. For this purpose, the comparator is followed by a latch 28z, which changes state when it is detected that the signal $S_T$ is zero. This control signal Sz starts the timing means 14. Starting from this instant, the predetermined temperature can be changed to the second value, for example approximately 180°–200° C. The comparator 27z again checks whether the signal $S_T$ is zero. This occurs when the bread reaches this second predetermined temperature. The comparator 27z again changes the state of the latch 28z, as a result of which the timing means 14 are stopped.

Figure 5:
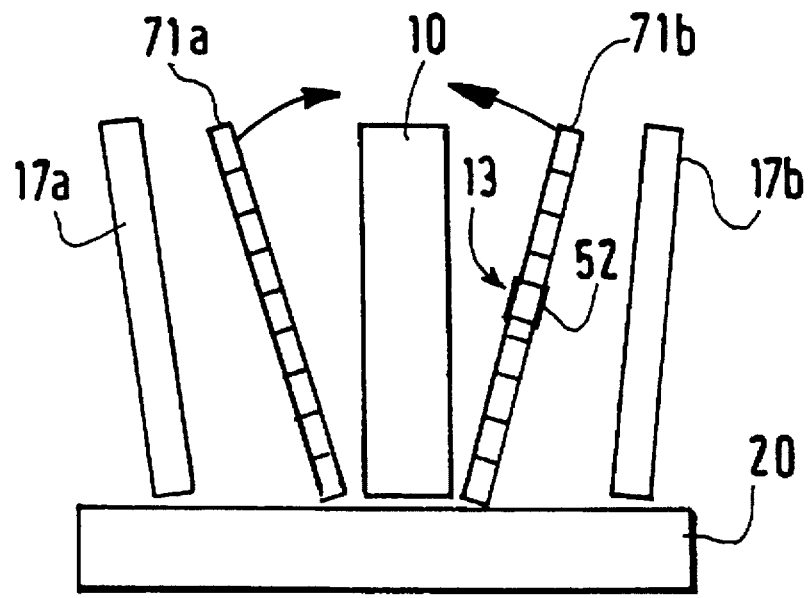
FIG. 5 is a diagram showing the main elements of a toaster comprising a temperature sensor which comes into contact with the bread.

It is possible to use other types of temperature sensor, particularly temperature sensors without mechanical contact such as bolometers, or temperature sensors which are brought into mechanical contact with the product. FIG. 5 shows an example of an embodiment comprising a sensor of the last-mentioned type. This Figure shows diagrammatically a toaster having grids 71a, 71b which are hinged relative to a base 20, so as to allow them to be applied to the bread 10 to be toasted. One of the grids 71b comprises a temperature sensor 13, which contacts the bread when the grids are applied. Heating elements 17a, 17b, which may be hinged, enable the bread to be toasted through the grids 71a, 71b.

Figure 6:
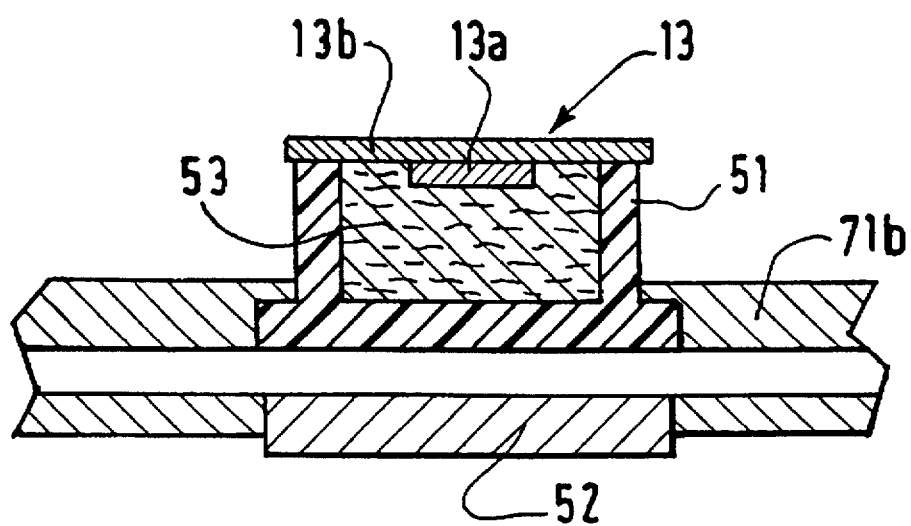
FIG. 6 is a detailed diagram of the arrangement of the sensor to be brought into contact with the bread in accordance with FIG. 5.

Preferably, the temperature sensor is a surface sensor (FIG. 6). It is recommendable for the sensor to have a low heat capacity and small dimensions so that it does not hinder toasting of the bread. The temperature sensor 13 can be protected by a screen 52 in order to ensure that it does not receive direct radiation from the heating elements. For thermally insulating the movable grid it can be mounted in an insulating support 51 of, for example, teflon or another composite material having a low thermal conductivity. A felt 53 or a high-temperature insulating foam, interposed between the sensor element and the support, can further improve this insulation. The sensor can be a thin-film thermocouple or a bolometer 13a deposited on a polymer film (for example polyimide) or on a thin but mechanically rigid ceramic 13b. As in the foregoing, the temperature sensor forms part of the detection means which detect the temperature of the bread.

What is claimed is:

1. An appliance (5) for toasting a product (10), comprising:

heating means (17), control means (11) for controlling the heating means, timing means (14) to provide time control of the control means, detection means (12) for detecting variations of a toasting condition of the product during toasting and for supplying at least one control signal which activates the timing means when at least one toasting condition threshold is reached, characterized in that the detection means (12) comprise a temperature sensor (13) which measures a temperature of the product, the detection means comprising a first comparison means (27d) for supplying a first control signal (Sd) which starts the timing means when the temperature of the product is higher than a predetermined temperature (Td) which defines a first toasting condition threshold.

2. An appliance as claimed in claim 1, characterized in that the detection means comprise a second comparison means (27f) for supplying a second control signal (Sf) when the temperature of the product reaches a second predetermined temperature (Tf) which defines a second toasting condition threshold, the timing means being responsive to the first control signal to supply a heating-characteristic change signal (Ca) to the control means and being responsive to the second control signal (Sf) to supply a turn-off signal (Cf) to said control means in order to turn off the heating means.

3. An appliance as claimed in claim 1, characterized in that the timing means (14) comprise a counter (19), triggered by the first control signal (Sd), which counter measures a time control period, the timing means supplying a turn-off signal (Cf) to the control means (11) when the time control period has reached a predetermined length defining the end of toasting.

4. An appliance as claimed in claim 1, characterized in that the predetermined temperature defining the first toasting condition threshold is slightly higher than 100° C.

5. An appliance as claimed in claim 2, characterized in that the predetermined temperature defining the second toasting condition threshold lies in a range of temperatures from approximately 180° C. to 200° C.

6. An appliance as claimed in claim 3, characterized in that the timing means comprise setting means (18) enabling a user to set the predetermined time-control period.

7. An appliance as claimed in claim 1, characterized in that the timing means are responsive to the first control signal to supply a heating-characteristic change signal to the control means.

8. An appliance as claimed in claim 1, characterized in that the detection means comprise a third comparison means (27c) for supplying a third control signal (Sc) having two states so as to control a process of defrosting the product, the timing means being such that they are started by the first state when the temperature of the product is lower than 0° C. and ate stopped by the second state when the temperature of the product is over 0° C.

9. An appliance as claimed in claim 1, characterized in that the detection means comprise a third comparison means (27c) for supplying a third control signal (Sc) when the temperature of the product is lower than 0° C., the timing means being such that they are started by the third control signal and are stopped after a predetermined period.

10. An appliance as claimed in claim 1, characterized in that the temperature sensor is a sensor which without mechanical contact measures infrared radiation emitted by the product.

11. An appliance as claimed in claim 10, characterized in that the detection means (12) comprise a fourth comparison means (27z) for determining the temperature of the product by detecting an equilibrium in the fluxes exchanged between the temperature sensor (13) and the product (10).

* * * * *